(12) United States Patent  
Kuwana et al.

(10) Patent No.: US 6,397,008 B2  
(45) Date of Patent: May 28, 2002

(54) DRIVING SYSTEM WITH ELASTICALLY SUPPORTING UNITS

(75) Inventors: Minoru Kuwana, Osaka; Junichi Tanii, Izumi; Yukio Maekawa, Sakai, all of (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/735,631

(22) Filed: Dec. 14, 2000

(30) Foreign Application Priority Data

Dec. 17, 1999 (JP) .......................................... 11-359095

(51) Int. Cl.[7] ...................... G03B 17/00; G02B 27/64; H01L 41/08
(52) U.S. Cl. ......................... 396/55; 359/557; 318/34; 318/116; 310/323.17
(58) Field of Search ................... 396/55, 52; 359/557, 359/554; 318/116, 38, 34; 310/323.17

(56) References Cited

U.S. PATENT DOCUMENTS

| | | | |
|---|---|---|---|
| 5,153,633 A | 10/1992 | Otani | 396/55 |
| 5,444,512 A * | 8/1995 | Morizumi | 396/55 |
| 5,592,251 A | 1/1997 | Kai | 396/55 |
| 5,671,448 A | 9/1997 | Usui | 396/55 |
| 5,768,016 A * | 6/1998 | Kanbara | 359/557 |
| 5,842,053 A * | 11/1998 | Ueyama et al. | 396/55 |
| 5,870,634 A | 2/1999 | Sugaya et al. | 396/55 |
| 2001/0004420 A1 * | 6/2001 | Kuwana et al. | 396/55 |

* cited by examiner

Primary Examiner—W. B. Perkey  
(74) Attorney, Agent, or Firm—McDermott, Will & Emery

(57) ABSTRACT

A driving mechanism for holding and shifting a part to be driven. The mechanism has at least three carrying elements for carrying the part elastically by exerting force upon the part in directions generally perpendicular to an axis of the part, at least one of the carrying elements being of a actuating type including a frictional actuator, the frictional actuator having a contact face for contacting the part under the pressure, the contact face oscillating at high frequency so as to make the part move in a direction almost rectangular to that of exerting the force upon the part.

14 Claims, 5 Drawing Sheets ns a driving system with elastically supporting units. More specifically, the present invention relates to the driving system for driving a driven member in a plane.

DRIVING SYSTEM WITH ELASTICALLY SUPPORTING UNITS

This application is based upon application No. 11-359095 filed in Japan, the contents of which are hereby incorporated by reference.

BACKGROUND OF THE INVENTION

1. Field of the Invention

The present invention relates to a driving system with elastically supporting units. More specifically, the present invention relates to the driving system for driving a driven member in a plane.

2. Description of the Related Arts

When a camera body is moved or shaken at time of photographing, an image-forming position or a position of object image, onto a photosensitive surface, is deviated or shifted out of position. In order to prevent such a deviation or shift of the image-forming position, there have been proposed various types of blur compensation mechanisms, in which a blur compensation lens provided in a lens barrel is moved suitably, on a basis of the detected direction and distance of the deviation caused by such a shaking of the camera body, so as to keep the deviation of the image-forming position onto the photosensitive surface within a certain range.

However, the conventional blur compensation mechanisms are constructed so that two blur compensation lenses are driven independently in two directions perpendicular to each other, because they are needed to be driven precisely at high speed. Thereby, the construction thereof becomes large, and it is difficult to make the mechanism compact, especially in a direction of an optical axis, i.e. in a direction perpendicular to the driving directions in which the blur compensation lenses are driven.

SUMMARY OF THE INVENTION

Accordingly, it is an object of the present invention to provide a driving system that is compact in a direction perpendicular to the driving directions in which the blur compensation lens is driven to move.

In order to achieve the above object, there is provided a driving system comprising: a driven member; and at least three supporting units for supporting the driven member and for elastically urging the driven member in directions generally perpendicular to an axis thereof, at least one of the supporting units being of a driving type including a frictionally driving unit, the frictionally driving unit being restrained from moving a direction perpendicular to a direction in which the driven member is urged and having a contact portion for contacting the driven member under pressure, the contact portion vibrating at high frequency so as to move the driven member in a direction generally perpendicular to the direction in which the driven member is urged.

In the construction, the driven member is supported on at least three supporting points, as the result of the balance of urging forces of the supporting units. The contact portion of the frictionally driving unit, which is included by at least one of the supporting units, can move or drive at least one of the supporting points by the vibration thereof so that the driven member is moved to and supported at new balanced position. That is, it is possible to move the driven member.

In the construction, the frictionally driving unit may include, for example, a piezoelectric actuator, which is of the successively driving type, more specifically, a vibration motor or so-called ultrasonic motor in which high frequent vibration makes the driven member moved. In the case, the vibration motor may be of a stationary wave type, of which the contact portion for contacting the driven member vibrates in elliptic shape in a stationary manner. Also, it may be of a progressive wave type, which drives the driven member by means of the surface vibration in elliptic shape caused by the progressive wave. Depending on the contact of the frictionally driving unit with the driven member under pressure, it is possible to move the driven member by the small distance so as to control the movement of the driven member precisely with high resolution. Thus, after driving the driven member, it is possible to support the driven member without play.

In the construction, since the supporting units support the driven member from directions perpendicular to the axis of the driven member the supporting units can be disposed only in the space which extends in driving directions, except for in the space which extends in a direction perpendicular to driving direction.

Accordingly, the driving system can be made compact in the direction perpendicular to the axis of the driven member.

As an embodiment, all of the supporting units may be of the driving type.

In this embodiment, even if the force perpendicular to urging direction of respective supporting units is applied, sliding is caused between the driven member and the supporting units. Thus, the supporting unit cannot be forced excessively and can drive the driven member with small force at the stabile condition.

As another embodiment, at least two of the supporting units may be of the driving type.

In this embodiment, in the case that the driving type of supporting units are disposed not parallel to each other, it is possible to move the driven member in two directions. Meanwhile, in the case that the driving type of the supporting units are disposed parallel to each other, it is possible to rotate the driven member.

As still another embodiment, the at least one of the supporting units being of the driving type may urge the driven member toward the axis of the driven member elastically so as to support the driven member.

In this embodiment, urging toward the axis of the driven unit cannot cause redundant moment in the driven member. Thereby, the contact portion of the driving type of supporting units contact the driven member equally so as to drive the driven member at the stable condition.

As still another embodiment, there may be provided two pairs of the supporting units beside the driven member at right angles in a plane perpendicular to the axis of the driven unit, and at least one of each of the two pairs thereof may be of the driving type.

In this embodiment, each pair of the supporting units is disposed perpendicular to each other and at least one of the pairs is of the driving type. Thus, it is possible to drive the driven member in two directions without rotating it.

As still another embodiment, there may be provided three of the supporting units beside the driven member at generally trisected positions in a plane perpendicular to the axis of the driven member so as to urge the driven member toward the axis of the driven member, and at least two of the supporting units being of the driving type.

In this embodiment, at least two of the driving type of the supporting units, disposed about 120 degree apart, can drives the driven member in two directions by the resultant force thereof. Moreover, it is possible to rotate the driven member.

As still another embodiment, the driving system may further comprise a holding unit for holding the driven member, the holding unit including: an urging member for urging the driven member in a direction parallel to the axis of the driven member; and a contacting member for contacting the driven member so as to prevent the driven member from moving in a direction of urging the driven member. In this embodiment, the holding unit can keep the position of the driven member constant in a direction parallel to the axis of the driven member.

In this embodiment, the urging member may include a contact face, contacting the driven member under the pressure and urged by the supporting, the contact face tilting to (or being inclined against) both the axis of the driven member and a plane perpendicular to the axis of the driven member so as to generate a component of urging force in a direction parallel to the axis of the driven member. By means of the component of urging forces in the direction parallel the axis of the driven member, it is possible to support the driven member elastically and to make the construction of the driving system compact.

Above mentioned constructions of the driving system is suitable to a blur compensating apparatus to drive an image blur compensation lens in a direction perpendicular to an optical axis thereof.

Further, in order to achieve the above object, there is provided a driving system comprising: a driven member; a guide for guiding the driven member movably in a plane; a first elastic member for contacting the driven member from a first direction in the plane; a second elastic member for contacting the driven member from a second direction in the plane; and a third elastic member for contacting the driven member from a third direction in the plane, the third elastic member including a contact portion for contacting the driven member, the contact portion being restrained from moving in a direction perpendicular to the third direction in the plane and vibrating in the direction perpendicular to the third direction in the plane.

As an embodiment, the second elastic member may include a second contact portion for contacting the driven member, the second contact portion being restrained from moving in a direction perpendicular to the second direction in the plane and vibrating in the direction perpendicular to the second direction in the plane.

In this embodiment, the second direction may be perpendicular to the third direction.

Moreover, the driving system may further comprise a forth elastic member for contacting the driven member from a forth direction in the plane, the first direction opposing the second direction, and the third direction opposing the forth direction.

As another embodiment, the driven member may have a circular contact face for contacting the first elastic member, the second elastic member, and the third elastic member at generally trisected positions.

BRIEF DESCRIPTION OF THE DRAWINGS

This and other objects and features of the present invention will become clear from the following description taken in connection with the preferred embodiments thereof with the reference to the accompanying drawings, in which.

DETAILED DESCRIPTION OF THE PREFERRED EMBODIMENTS

Figure 1:
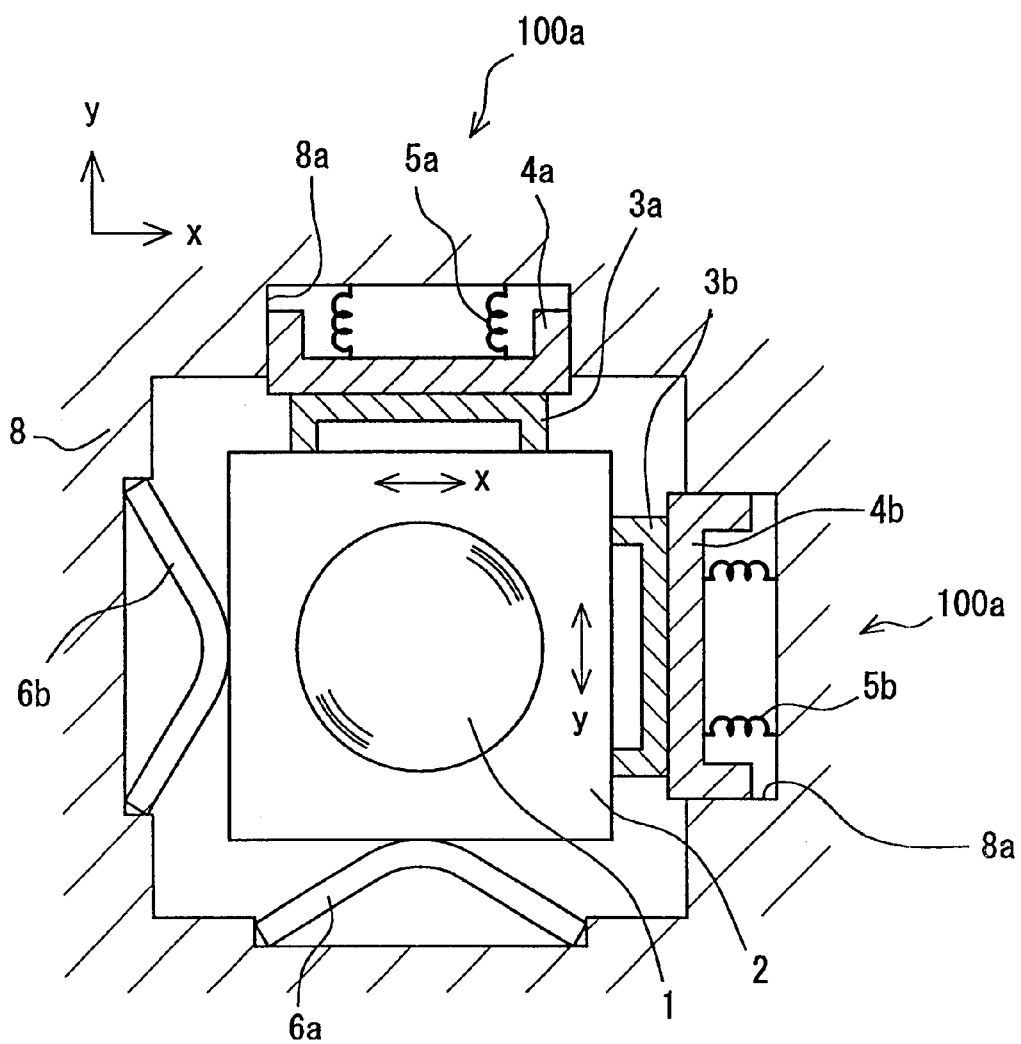
FIG. 1 is a schematic cross sectional view showing a main part of a driving system according to a first embodiment of the present invention.

Before the description of the preferred embodiments of the present invention proceeds, it is to be noted that like or corresponding parts are designated by like reference numerals throughout the accompanying drawings.

First, referring to FIG. 1 and FIGS. 3 though 5, a description is made below in detail on a driving system, which is provided in a camera, for driving an image shake preventing lens (or blur compensation lens) 1, according to a first embodiment of the present invention.

FIG. 1 shows the driving system. A lens frame 2 for supporting the image shake preventing lens 1 has a generally square section (i.e. four outer sides forming a square) along a plane, in which the image shake preventing lens 1 moves so as to compensate the deviation of the image-forming position onto the photosensitive surface. The four outer sides of the lens frame 2, which form the square section, are supported by two pairs of elastically supporting units 100a, 6a; 100b, 6b. Each pair thereof 100a, 6a; 100b, 6b is disposed in a direction perpendicular to each other relative to the lens frame 2. One 100a, 100b of the each pair is of a driving type and includes an ultrasonic actuator 3a, 3b, which contacts the corresponding outer side of the lens frame 2 radially and drives the lens frame 2. Such a construction is suitable, for example, in case that there is not enough space to arrange the driving system in a direction of an optical axis inside a lens barrel.

More specifically, the actuators 3a and 3b drive the lens frame 2 linearly in the directions x and y, respectively. The lens frame 2, which supports the image shake preventing lens 1, is urged by springs 5a, 5b, via the actuator 3a, 3b and actuator bases 4a, 4b, respectively. The lens frame 2 is urged by each of the springs 6a, 6b in an opposed direction relative to that of each of the springs 5a, 5b. Thereby, the lens frame 2 is positioned in two directions x and y. The actuators 3a, 3b are adhesively bonded to the actuator bases 4a, 4b, respectively. As an alternative to the bonding method just above described, the actuator bases 4a, 4b may have mounting grooves, with which the actuators 3a, 3b may engage.

The actuator bases 4a and 4b are restrained from moving in the directions x and y by guiding grooves 8a and 8b, which are formed in a fixing cylinder 8, respectively. The actuator bases 4a and 4b are restrained from moving in a direction of the optical axis, as not shown. Thus, the actuator base 4a is able to move in only one direction y, and the actuator bases 4b is able to move in only one direction x.

Figure 4:
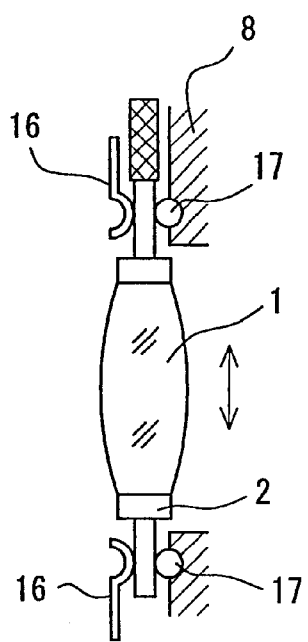
FIG. 4 is a vertical sectional view of the driving system of FIG. 1.

As schematically shown in FIG. 4, the lens frame 2 is guided by a spring 16 and a ball 17 so as to be able to move only in a plane perpendicular to the optical axis. That is, the lens frame 2 is urged in a direction of the optical axis by the spring 16 against a ball 17, which is held by the fixing cylinder 8 and reduces the friction between the lens frame 2 and the fixing cylinder 8, so as to be prevented from faltering. Thus, the lens frame 2 is restrained from moving in a direction of the optical axis.

Figure 3A:
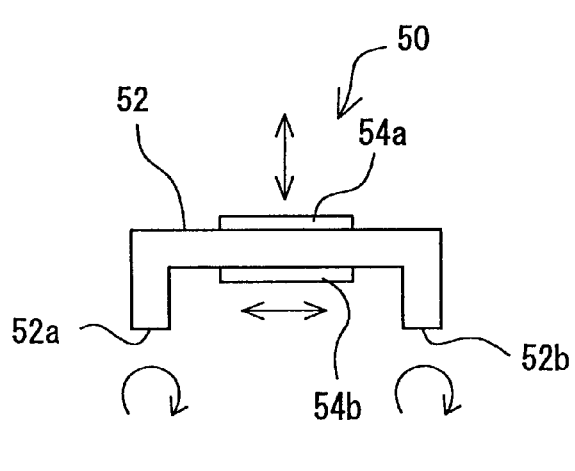
FIG. 3A is a schematic view showing a main part of an actuator employed in the driving system of FIG. 1.

As for each of the actuators 3a, 3b, an ultrasonic motor 50, which is shown in FIG. 3A, is used. The reason why the ultrasonic motor is used for driving the image shake preventing lens is that the ultrasonic motor has many advantages as compared to the other types of actuators. For example, the ultrasonic motor can drive it from initial speed to final speed in a short time and therefore has high following property. The ultrasonic motor can drive it quickly in a reverse direction. The construction of the ultrasonic motor is simpler than that of the other types of actuators.

The ultrasonic actuator 50 has a pair of projecting portions, tip surfaces 52a, 52b of which can oscillate or vibrate in elliptic shape in the range of ultrasonic frequency. The lens frame 2, which contacts the tip surfaces 52a, 52b under pressure, is driven frictionally in a direction of tangent line with respect to the elliptic shape of the tip surfaces 52a, 52b oscillating.

More specifically, the ultrasonic motor 50 has an elastic metal plate 52, formed at right angles in a general shape of a "U." That is, the elastic metal plate 52 has a main body and two projecting portions. At central parts on both main surfaces of the main body, piezoelectric elements 54a, 54b are bonded or fixed. Alternating current voltage is applied to the piezoelectric elements 54a, 54b. Thereby, for example, as indicated by arrows in FIG. 3A, one 54a of the piezoelectric elements is expanded and contracted in a direction of thickness of the main body of the elastic metal plate 52, and the other 54b thereof is expanded and contracted in a direction in which the main body thereof expands. Thus, the elastic metal plate 52 is vibrated in various resonant modes including, for example, bending vibration, and/or axial vibration. As a result of composition of such various vibrations, the tip surfaces 52a, 52b of the projecting portions are vibrated in the elliptic or oblong shape, as shown in FIG. 3A. The phases of such an elliptic vibration of the tip surfaces 52a, 52b are to be sifted generally in a half period (or cicle).

Figure 3B:
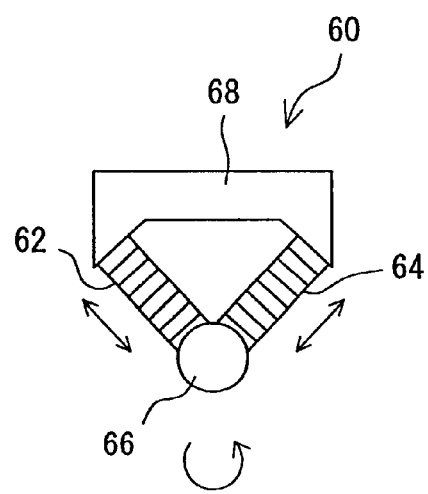
FIG. 3B is a schematic view showing a main part of an actuator according to a modification of the actuator of FIG. 3A.
Figure 6:
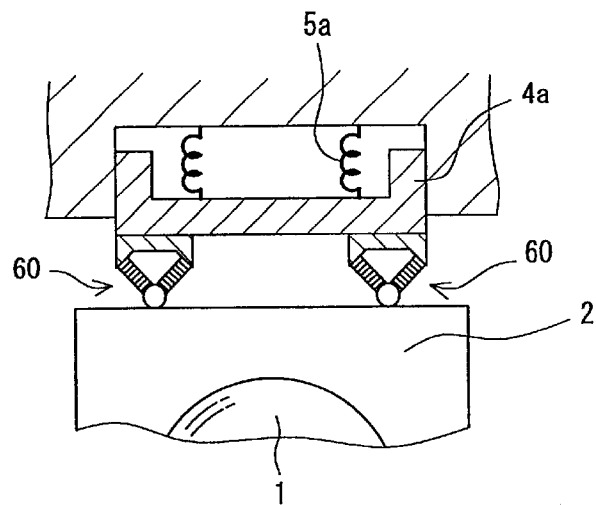
FIG. 6 is a cross sectional view showing a main part of a driving system according to a modification of the driving system of FIG. 1.

Alternatively, an ultrasonic motor 60 as shown in FIG. 3B may be used in stead of the ultrasonic motor 50. The ultrasonic motor 60 have a base portion 68 and piezoelectric elements 62 and 64, which are connected to each other in a general shape of a triangle. The piezoelectric elements 62, 64 are expanded and contracted in shifting phases, so that a surface of a cylinder connected to the elements 62, 64 is vibrated in a elliptic shape. It is better to use a pair of two ultrasonic motors 60 as shown in FIG. 6 in order to prevent the lens frame 2 from rotating.

Referring to FIG. 1, when a voltage is applied to the piezoelectric elements of the actuator 3a so as to vibrate the contact portion thereof contacting the lens frame 2 in the elliptic shape, the lens frame 2 is moved in a direction tangent to the ellipse, i.e. in the direction x. Meanwhile, the lens frame 2 slides over the spring 6a. Through movement of the lens frame 2 in the direction x, urging force (or biasing force) exerted by the spring 5b and that exerted by the spring 6b are unbalanced to each other. However, the lens frame 2 is held in a stationary position (or stopping position) when the lens frame 2 stops moving, by static friction exerting between the actuator 3a and the lens frame 2 and by that exerting between the spring 6a and the lens frame 2. Meanwhile, the lens frame 2 keeps a neutral position in the direction y by means of the spring 5a, 6a. Namely, the lens frame 2 is driven in the direction x only.

Similarly, the lens frame 2 is driven in the direction y by the actuator 3b.

Accordingly, the actuators 3a, 3b can control the position of the lens frame 2 in the directions x and y independently.

Figure 5:
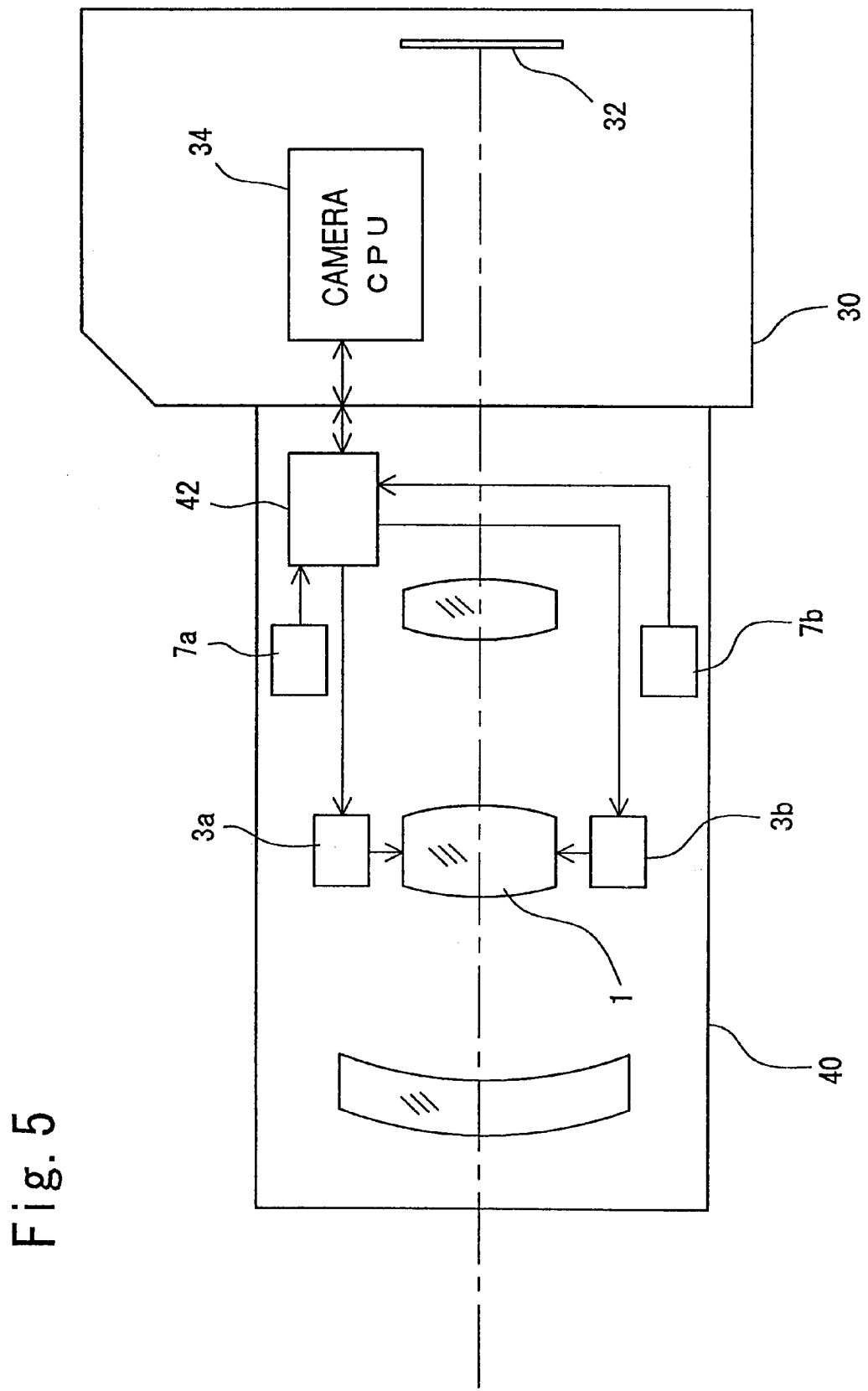
FIG. 5 is a schematic diagram of a camera, which uses the driving system of FIG. 1.

FIG. 5 shows a block diagram of the camera, provided with the driving system. The camera uses an imaging lens (photographing lens) 40 equipped with the shake preventing lens 1.

The imaging lens 40 is provided with actuators 3a, 3b for driving the shake preventing lens 1 in directions x and y respectively, shake detectors (bluer detectors) 7a, 7b, for example, which are acceleration sensors, for detecting shakes or blurs in directions x and y respectively, and a lens microcomputer 42 connected thereto. A camera body 30 includes a camera CPU 34 for controlling the operation of the camera totally. The camera CPU 34 and the lens microcomputer 42 are connected to each other so as to communicate therewith mutually. The camera body 30 has a CCD photo acceptance unit 32, disposed on a focus plane of the imaging lens 40. The CCD photo acceptance unit 32 transforms the light energy into electric energy photoelectrically and outputs image signal.

The lens microcomputer 42 performs the operation of compensating the shake of the camera body on a basis of an instruction from the camera CPU 34. That is, the lens microcomputer 42 receives shake information from the shake detectors 7a, 7b and then evaluates adjusting distance and direction of the shake preventing lens 1, based on the shake information. Then, the lens microcomputer 42 controls the actuators 3a, 3b so as to drive the shake preventing lens 1 in a plane perpendicular to the optical axis, i.e. in a x-y plane. Thus, if the shake or vibration may occur, it is possible to reduce the deviation of the imaging position relative to the photosensitive surface, i.e. the plane of the CCD photo acceptance unit 32, below a certain range.

Next, referring to FIGS. 2A, 2B, 3 and 7, a description is made below in detail on a driving system of an image shake preventing lens 9, according to a second embodiment of the present invention.

Figure 2A:
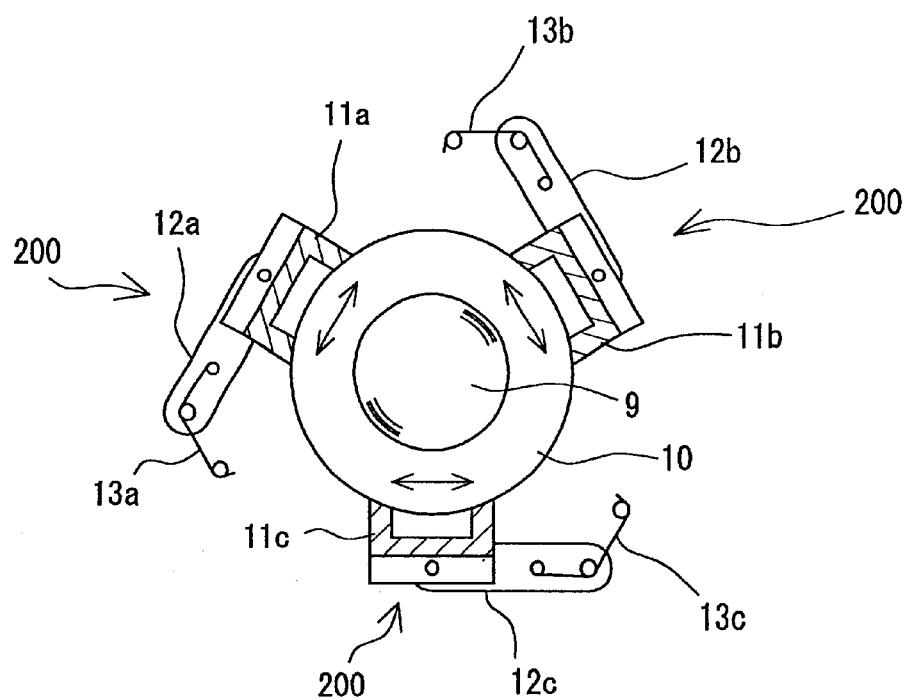
FIGS. 2A and 2B are schematic cross sectional views showing main parts of a driving system according to a second embodiment of the present invention.

As shown in FIG. 2A, a lens frame 10 holding the image shake preventing lens (or blur compensation lens) 9 has a circular section along a plane, in which the image shake prevent lens 9 moves so as to compensate the deviation of the image-forming position onto the photosensitive surface. The outer side of the lens frame 10, which forms the circular section, is supported by three elastically supporting members 200, one end of each of which is rotatably supported by the fixed cylinder (or stationary cylinder).

Figure 2B:
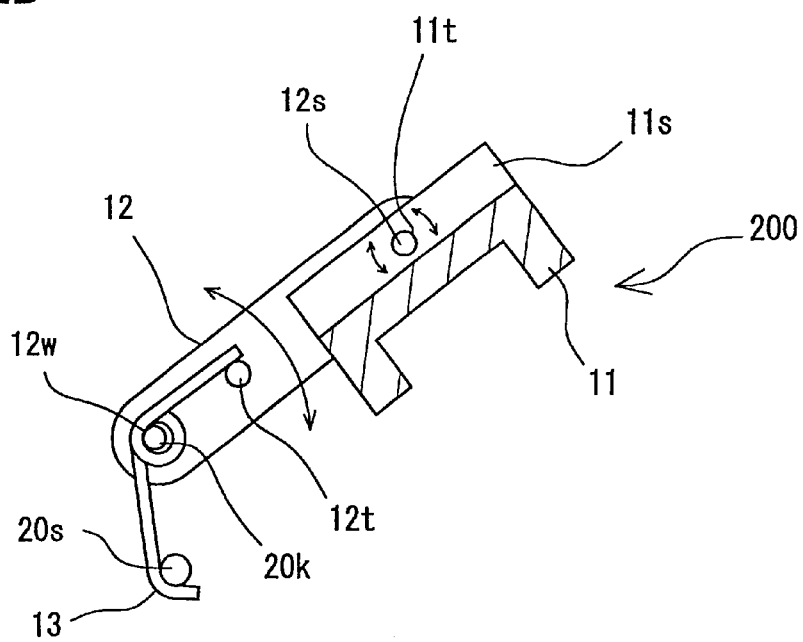

Each elastically supporting member 200 is constructed as shown in FIG. 2B. That is, an arm 12 has a hole 12w in an end portion thereof, through which an axis 20k, fixed on the fixing cylinder, passes so as to support the arm 12 rotatably. The arm 12 is urged toward the lens frame 10 by means of a torsion spring 13. The torsion spring 13 has a coil portion inside which the axis 20k is fitted with some play, and end portions which are hooked on a projection 12t of the arm 12 and a projection 20s of the fixing cylinder, respectively.

The actuator 11 is an ultrasonic motor 50 as well as that shown in FIG. 3A according to the first embodiment of the present invention, and bonded or fixed to an actuator base 11s, as well as the first embodiment. A projection 12s, which is provided on the other end of the arm 12, projects into a hole lit of the actuator base 11s. Thereby, the actuator 11 is supported by the arm 12, so as to be able to swing rotatably.

Referring to FIG. 2A again, the actuators 11a, 11b and 11c, which contact under the pressure with the lens frame 10 by the biasing force of the torsion coil springs 13a, 13b and 13c respectively, can drive the lens frame 10. With this arrangement, the arms 12a, 12b, 12c rotate accordingly. Namely, it is possible to move the shake preventing lens 9 in any direction in the plane perpendicular to the optical axis by controlling driving amount of the actuators 11a, 11b, 11c. The operation, such as shake preventing operation and so on, is similar to the first embodiment, except for a holding mechanism of the lens frame 10.

By the way, if the lens frame is driven by the actuators from a direction radial to the lens frame, it is necessary to prevent the lens frame from moving in a direction parallel to the optical axis. For example, it is necessary for the lens frame to be urged toward a stationary member by means of the spring 16, as shown in FIG. 4, and so on. Such additional parts, which are not needed in case that the lens is driven from a direction parallel to the optical axis, may make a mechanism bigger and may increase its production cost.

Figure 7:
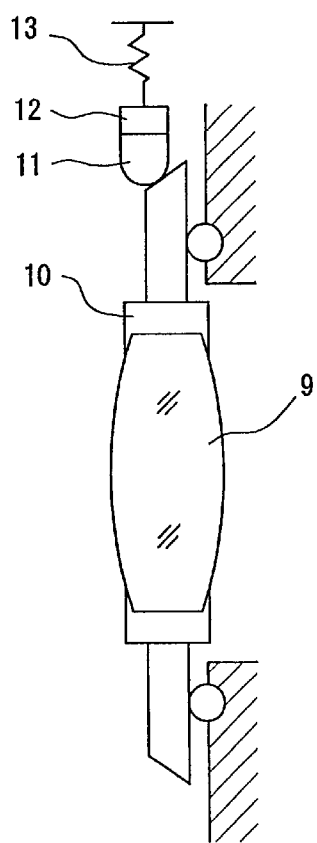
FIG. 7 is a vertical sectional view of FIG. 2.

Therefore, as shown in FIG. 7, the lens frame 10 has a contact surface, for contacting the actuator 11, which is tilted with respect to the optical axis. The contact surface causes axial component of the force exerted by the spring, i.e. a component thereof in a direction parallel to the optical axis. Namely, the spring 13, which urges the actuator 11 toward the lens frame 10, is used in order to restrain the lens frame 10 in a direction parallel to the optical axis, as well as to drive the lens frame 10.

Though FIG. 7 shows the example on a basis of the driving system as shown in FIG. 2, it is possible to similarly construct the driving system as shown in FIG. 1. In that case of FIG. 1, not only surfaces to contact the actuator 3a, 3b, but those to contact the spring 6a, 6b, are needed to be tilted with respect to the optical axis.

As above described, by arranging the actuators in the space provided radially with respect to the shake preventing lens, the size of the driving system for driving the shake preventing lens can be reduced in the direction of the optical axis.

Although the present invention has been fully described in connection with the preferred embodiments thereof with reference to the accompanying drawings, it is to be noted that various other changes and modifications are also apparent to those skilled in the art.

The driving system according to the preferred embodiment can drive a part by minute distance at high speed. Thus, it is possible to apply the driving system to various apparatus.

For example, it is possible to support and drive the CCD photo acceptance unit, instead of the image shake preventing lens, similarly to the first embodiment as described above, so as to compensate the deviation of the image-forming position onto the photosensitive surface.

Such a driving system can be applied to so-called pixel shifting. That is, in order to increase superficial numbers of the pixels in the CCD photo acceptance unit, the driving system drives the CCD photo acceptance unit minutely so as to fill in the blanks between pixels.

The driving system, such as the above mentioned second embodiment, can not only translate but rotate a part. Therefore, the driving system can be applied to the high accuracy moving stage, for example, which is used to process a cell under the microscope or which is used in the process of manufacturing the electronic parts.

What is claimed is:

1. A driving system comprising:
 a driven member; and
 at least three supporting units for supporting the driven member and for elastically urging the driven member in directions generally perpendicular to an axis thereof, at least one of the supporting units being of a driving type including a frictionally driving unit, the frictionally driving unit being restrained from moving a direction perpendicular to a direction in which the driven member is urged and having a contact portion for contacting the driven member under pressure, the contact portion vibrating at high frequency so as to move the driven member in a direction generally perpendicular to the direction in which the driven member is urged.

2. The driving system as claimed in claim 1, wherein all of the supporting units are of the driving type.

3. The driving system as claimed in claim 1, wherein at least two of the supporting units are of the driving type.

4. The driving system as claimed in claim 1, wherein the at least one of the supporting units being of the driving type urges the driven member toward the axis of the driven member elastically so as to support the driven member.

5. The driving system as claimed in claim 1, wherein there are provided two pairs of the supporting units beside the driven member at right angles in a plane perpendicular to the axis of the driven member, and at least one of each of the two pairs thereof is of the driving type.

6. The driving system as claimed in claim 1, wherein there are provided three of the supporting units beside the driven member at generally trisected positions in a plane perpendicular to the axis of the driven member so as to urge the driven member toward the axis of the driven member, and at least two of the supporting units are of the driving type.

7. The driving system as claimed in claim 1, further comprising a holding unit for holding the driven member, the holding unit including:
 an urging member for urging the driven member in a direction parallel to the axis of the driven member; and
 a contacting member for contacting the driven member so as to prevent the driven member from moving in a direction of urging the driven member.

8. The driving system as claimed in claim 7, wherein the urging member includes a contact face for contacting the driven member under the pressure, the contact face tilting to both the axis of the driven member and a plane perpendicular to the axis of the driven member so as to generate a component of urging force in a direction parallel to the axis of the driven member.

9. A blur compensating mechanism including the driving system as claimed in claim 1, wherein the driving system drives a blur compensation lens in a direction perpendicular to an optical axis thereof.

10. A driving system comprising:
 a driven member;
 a guide for guiding the driven member movably in a plane;
 a first elastic member for contacting the driven member from a first direction in the plane;
 a second elastic member for contacting the driven member from a second direction in the plane; and
 a third elastic member for contacting the driven member from a third direction in the plane, the third elastic member including a contact portion for contacting the driven member, the contact portion being restrained from moving in a direction perpendicular to the third direction in the plane and vibrating in the direction perpendicular to the third direction in the plane.

11. The driving system as claimed in claim 10, wherein the second elastic member includes a second contact portion for contacting the driven member, the second contact portion being restrained from moving in a direction perpendicular to the second direction in the plane and vibrating in the direction perpendicular to the second direction in the plane.

12. The driving system as claimed in claim 11, wherein the second direction is perpendicular to the third direction.

13. The driving system as claimed in claim 12, further comprising a forth elastic member for contacting the driven member from a forth direction in the plane, the first direction opposing the second direction, and the third direction opposing the forth direction.

14. The driving system as claimed in claim 11, wherein the driven member has a circular contact face for contacting the first elastic member, the second elastic member, and the third elastic member, at generally trisected positions.

\* \* \* \* \*